United States Patent [19]

Woodbury

[11] 3,764,869
[45] Oct. 9, 1973

[54] METHOD AND APPARATUS FOR PULSE WIDTH CONTROL FOR BRUSHLESS DC MOTORS

[75] Inventor: James R. Woodbury, Los Altos, Calif.

[73] Assignee: Standard Research Institute, Menlo Park, Calif.

[22] Filed: Feb. 26, 1973

[21] Appl. No.: 335,836

[52] U.S. Cl............................. 318/138, 318/254
[51] Int. Cl........................................... H02k 29/02
[58] Field of Search............... 318/138, 254, 326, 318/327, 328

[56] References Cited
UNITED STATES PATENTS
3,483,457   12/1969   Fertig................................ 318/254
3,696,277   10/1972   Liska................................. 318/254

Primary Examiner—Bernard A. Gilheany
Assistant Examiner—Thomas Langer
Attorney—Paul D. Flehr et al.

[57] ABSTRACT

A method and system for deriving drive pulses for brushless DC motors. Periodic shaft position signals are developed, one for each of the motor phases. A plurality of pulse width derivation means are provided, one for each of the motor phases. Each pulse width derivation means combines and rectifies the shaft position signals for all the motor phases other than the one phase for which the pulse is being derived to form a rectified signal. In accordance with one embodiment, comparator means are provided for comparing a control signal which can be a speed error signal to the rectified signal to form a drive pulse for the one phase. In other embodiments a periodic function having its period related to the period of the shaft position signals is added to the control signal to form a composite signal which is then compared to the rectified signal to develop drive pulses for the one phase.

9 Claims, 6 Drawing Figures

PATENTED OCT 9 1973          3,764,869

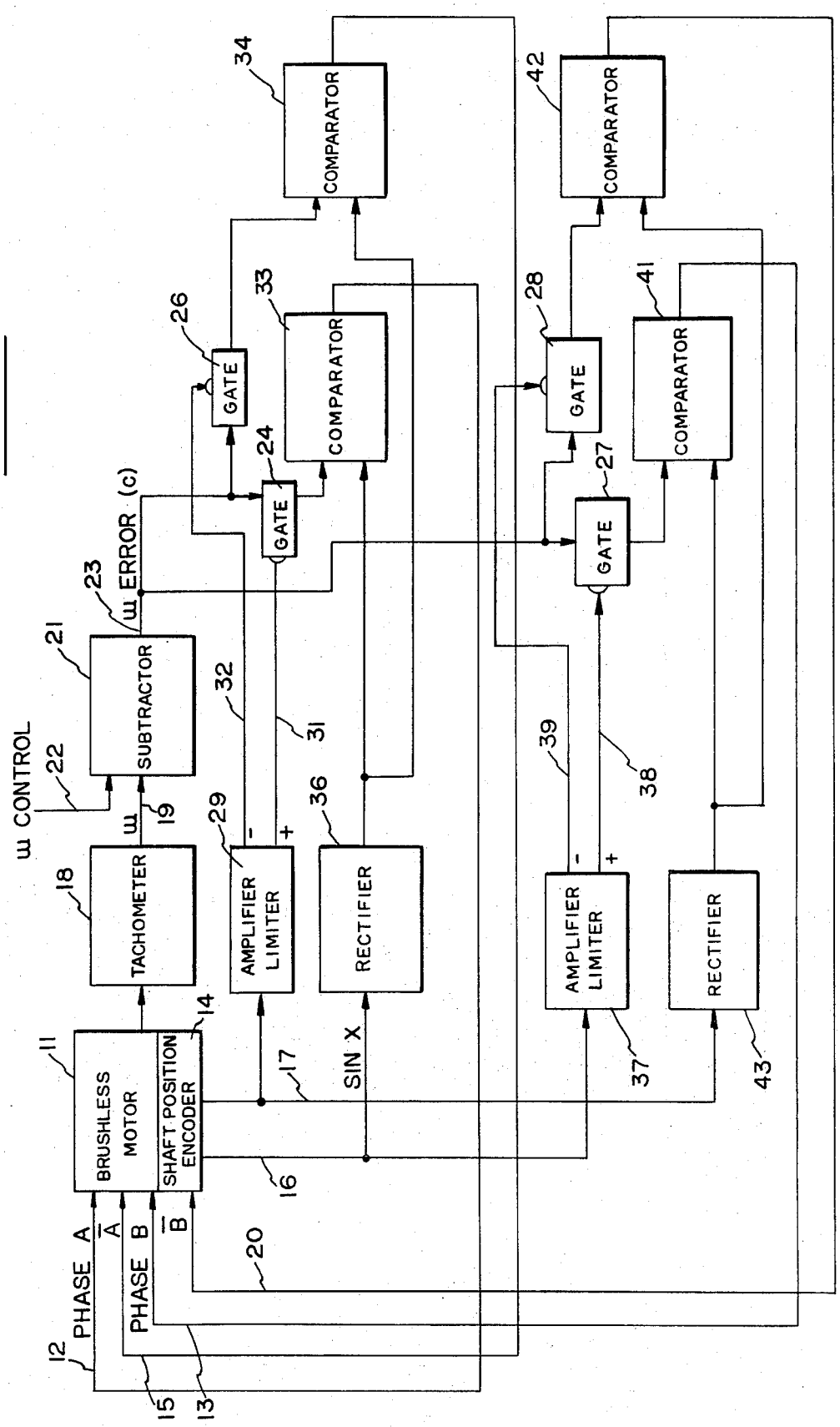

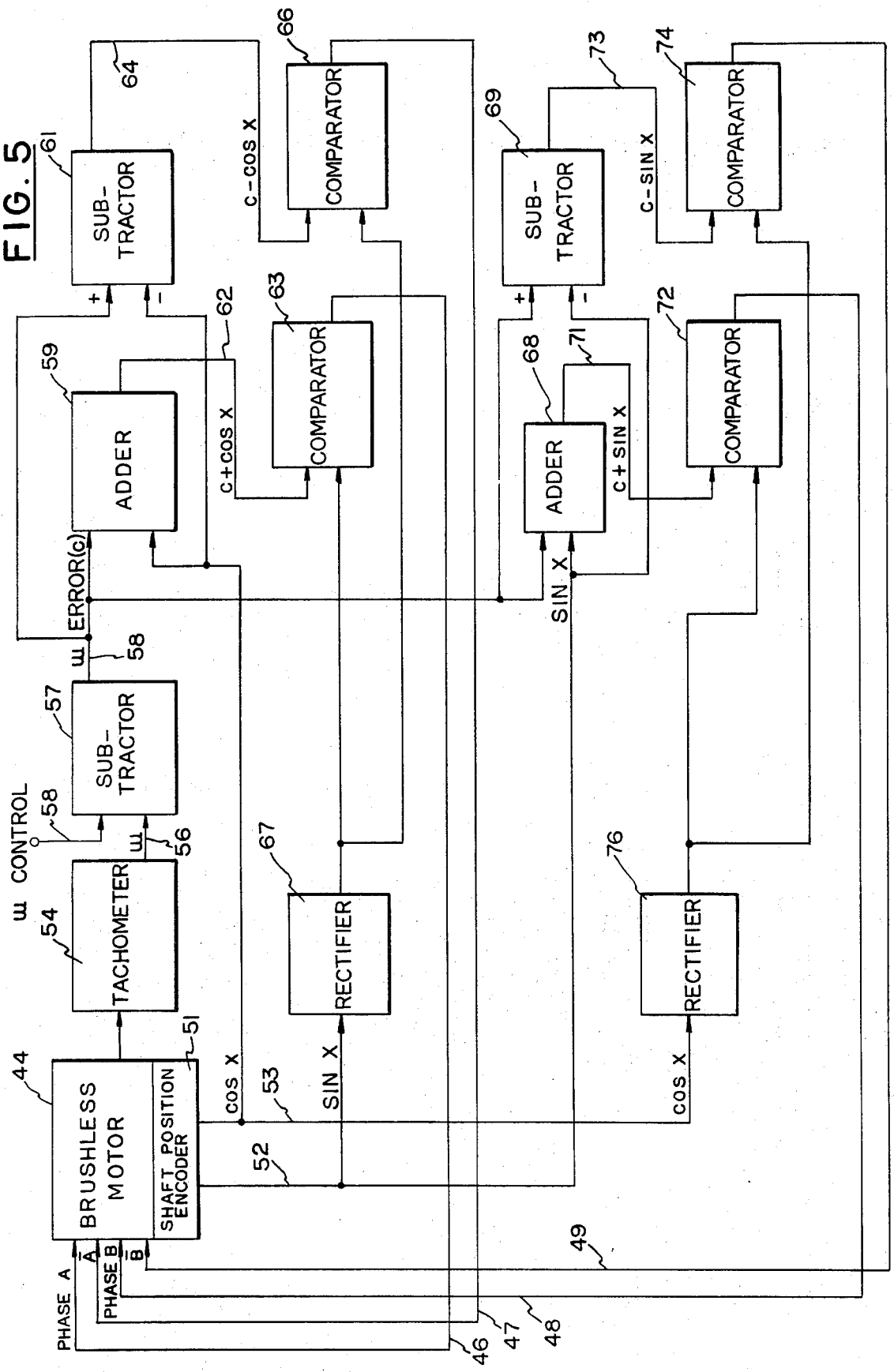

3,764,869

METHOD AND APPARATUS FOR PULSE WIDTH CONTROL FOR BRUSHLESS DC MOTORS

BACKGROUND OF THE INVENTION

This invention pertains to a method and system for pulse width control for brushless DC motors. In a brushless DC motor, electronic switching is used instead of a mechanical commutator and brush to connect the DC prime power to the phases of the motor winding. A motor shaft angle sensing device of some type is used to determine the position of the motor rotor and each motor phase is sequentially connected to the DC power with the time of connection of each of the phases being derived from the motor shaft position information. At a given motor speed the length of time for which each phase must be connected depends on the voltage of the DC prime power source, internal parameters of the motor, and the output torque required.

For application of brushless motors in situations where accurate speed control is required over a wide range of load conditions, a feedback loop is incorporated into the motor control. With such a feedback loop a feedback signal is derived from some type of motor speed sensing device and the speed signal is used to control the length of time for which each phase of the motors winding is connected to the DC prime power source; that is, to control the motor drive pulse width so that more power is supplied to maintain the motor speed when loading increases.

With prior art motor pulse width control techniques, however, the motor output torque at a given motor speed is not a linear function of the input control signal, which in this case is the derived feedback signal. In fact, the rate of change of motor output torque with respect to the feedback signal may approach infinity under certain conditions of light or no-load. As a result, feedback control systems become unstable under these conditions and "hunting" occurs.

OBJECTS AND SUMMARY OF THE INVENTION

It is therefore an object of this invention to provide a method and system for deriving motor drive pulses for a brushless DC motor in which the pulse width substantially linearly follows a control signal.

It is another object of this invention to provide a method and system for deriving motor drive pulses for a brushless DC motor in which the pulse width substantially linearly follows a control signal in systems where the control signal is incorporated in a feedback loop.

It is another object of this invention to provide a method and system for deriving motor drive pulses which provides a bounded, reasonably constant feedback gain.

Briefly, in accordance with one embodiment of the invention, a shaft position encoder associated with a brushless DC motor develops a plurality of periodic shaft position signals, one for each of the plurality of motor phases. Pulse width derivation means are provided, one for each of the motor phases. Each of the pulse width derivation means comprises means for combining and rectifying the shaft position signals for all the motor phases other than the one phase for which the pulse is being derived to form a rectified signal. The rectified signal is then compared to a control signal to develop a drive pulse for the one phase.

BRIEF DESCRIPTION OF THE DRAWINGS

FIG. 3 is a schematic diagram of a pulse width control system in accordance with one embodiment of the invention which produces the wave forms shown in FIG. 2.

FIG. 5 is a schematic diagram of another embodiment of a pulse width control system in accordance with this invention which produces the wave forms shown in FIG. 4.

DESCRIPTION OF THE PREFERRED EMBODIMENTS

Figure 1:
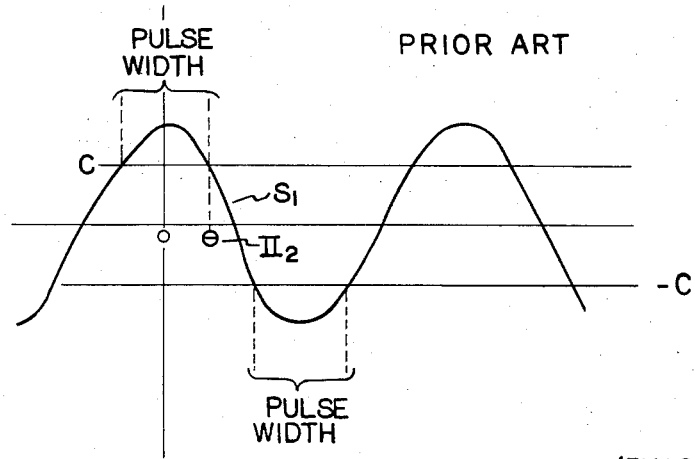
FIG. 1 is a wave diagram illustrating the fashion in which prior art circuits determine pulse width for one phase by a direct comparison of a feedback signal to the shaft position signal for that phase.

Assuming a two-phase motor winding, a derived motor control signal which determines pulse width can be denoted as $C$. The prime power voltage can be denoted $V_s$ and shaft position signals for each phase can be denoted as $S_1 = \cos x$ and $S_2 = \sin x$. The back emf voltages of the two motor phases can be denoted as $V_b \cos x$ and $V_b \sin x$ where $V_b$ is a function of the motor back emf constant and is proportional to motor speed. Typically, the motor drive pulse width is derived by comparing the control signal $C$ to $S_1$ and switching on the drive to the appropriate phase when $S_1$ is greater than $C$. Similarly, the drive to the other phase is switched on when $S_2$ is greater than $C$. The opposite polarity of drive is applied to each phase when $S_1$ is less than $-C$ or $S_2$ is less than $-C$. This prior art method of determining motor drive pulse width is illustrated by the wave form shown in FIG. 1. As can be seen in FIG. 1, the variation of pulse width with respect to the control signal $C$ can become extremely non-linear for small pulse widths, i.e., when $C$ is at or near the peak of the wave form $S_1$.

It can be further demonstrated that a prior art pulse width derivation system operating in accordance with FIG. 1 is unstable under certain conditions. The switching angle $\theta$ is the minimum positive angle for which $S_1$ equals $C$. Thus $C = \cos \theta$, where $0 \leq \theta \leq \pi/2$ radians. The feedback gain is proportional to the rate of change of $\theta$ with respect to $C$, and the rate of change of output torque $T$ with respect to $\theta$. Therefore, a feedback gain parameter can be defined as:

$$G = dT/d \, |d\theta/dC|  \tag{1}$$

The motor output torque is given by:

$$T = T_o \int_0^\theta \cos x \left(1 - \frac{V_b}{V_s} \cos x\right) dx \tag{2}$$

so that:

$$dT/d\theta = T_o (1 - V_b/V_s \cos \theta) \cos\theta \quad (3)$$

the value of $T_o$ is given by:

$$T_o = 2 V_s K_t/\pi R_\omega \quad (4)$$

where $R_\omega$ is the resistance per phase of the motor winding and $K_t$ is the peak torque sensitivity constant of the motor. For this case:

$$\left|\frac{d\theta}{dC}\right| = \left|\frac{1}{\frac{dC}{d\theta}}\right| = \frac{1}{\sin \theta} \quad (5)$$

thus:

$$G = T_o (1 - V_b/V_s \cos \theta) \cot \theta \quad (6)$$

An inspection of equation (6) illustrates that as $\theta$ approaches zero that $\cot \theta$ approaches infinity, so that $|G|$ approaches infinity as $\theta$ approaches zero. In this case $\theta$ approaching width corresponds to the torque approaching zero. Therefore a speed control feedback system using this type of motor drive pulse width derivation is unstable under no-load conditions for all speeds, except the speed where $V_b = V_s$, which is typically the maximum speed at which the motor is operated.

Figure 2:
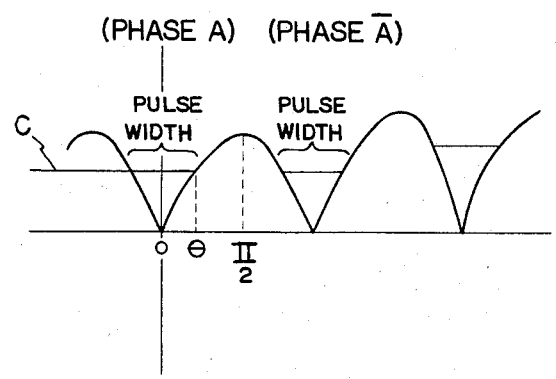
FIG. 2 is a wave diagram illustrating the determination of pulse width in accordance with one embodiment of the invention in which for a two-phase motor, pulse width is determined for one phase by comparing a feedback signal to the rectified shaft position signal for the other phase.

Referring now to FIG. 2, there are shown wave forms representative of a method of determining pulse widths for a brushless DC motor in accordance with this invention in which the pulse width is fairly linearly related to a control signal such as a feedback signal and in which, as will be hereafter described, the feedback gain is bounded. In FIG. 2, the control or feedback signal C is compared to the rectified value of $S_2$ to obtain the drive pulse for the $S_1$ phase. As will be hereinafter described in connection with a discussion of the circuitry, the signal C is a gated signal having a desired amplitude. In other words, voltage is applied to phase 1 when $C >$ $$|S_2| \text{ and } |x| < \pi/2. \text{ Thus: } C = \sin \theta \quad (10)$$

and $|d\theta/dC| = 1/\cos \theta \quad (11)$ so that $G/T_o = 1 - V_b/V_s \cos \theta \quad (12)$ An inspection of equation (12) shows that the feedback gain G is bounded for this case and it is simple to have a speed control feedback loop which is stable for all desired speeds and load torques.

Referring now to FIG. 3, there is shown a schematic electrical diagram of apparatus in accordance with this invention for determining the pulse widths for a brushless two-phase DC motor in accordance with the method shown by the wave forms in FIG. 2. A brushless DC motor 11 has in this instance two phases which can be referred to as phases A and B. Thus drive pulse inputs A and B are provided to motor 11 on circuits 12 and 13 and drive pulse inputs $\overline{A}$ and $\overline{B}$ are provided on circuits 15 and 20, where drive pulses $\overline{A}$ and $\overline{B}$ are 180° out of phase with drive pulses A and B, respectively. Typically, for a two phase brushless motor the sequence of drive pulse inputs is A, B, $\overline{A}$, $\overline{B}$ evenly spaced through the 360° rotation of the motor shaft.

A shaft position encoder 14 of some suitable type is associated with the motor 11 and provides shaft position signals on circuits 16 and 17. Suitable shaft position encoders include magnetic sensing devices such as Hall devices or light emitter-detecting systems appropriately positioned near the motor rotor. Synchros, or other types of shaft angle sensors or encoders attached to the motor shaft can also be used. These devices and schemes are well known to those skilled in the art. In accordance with the embodiment shown in FIG. 3 the shaft position signals developed on circuits 16 and 17 are sin $x$ and cos $x$.

The specific embodiment of the invention shown in FIG. 3 incorporates a feedback loop and a tachometer 18 is provided to sense the speed of the motor 11 and provide an output actual motor speed signal $\omega$ on a circuit 19. A subtractor 21 is provided which receives as an input the actual motor speed signal $\omega$ on circuit 19 and also receives as an input over a circuit 22 an $\omega$ control signal. The $\omega$ signal is a reference motor speed signal; that is, the $\omega$ control signal corresponds to the desired speed for the motor 11. The output of subtractor 21 is an $\omega$ error signal or the control signal C which is present on a circuit 23.

The C signal is the control signal for deriving the pulse width information as hereinafter described. In accordance with the specific embodiment shown in FIG. 3 this control signal C is generated as part of a feedback loop for controlling the speed of the motor 11. The invention is equally applicable, however, to control systems which do not have a feedback loop but in which a control signal is generated by any appropriate circuitry. A very simple form of circuitry for generating a control signal might simply be a manually controlled potentiometer, for example.

The control signal C in FIG. 3 forms inputs to a pair of gates 24 and 26. The cos $x$ shaft position signal on circuit 17 forms an input to an amplifier-limiter 29, which has plus and minus outputs on circuits 31 and 32 for driving the gating inputs of gates 24 and 26, respectively. The amplifier-limiter 29 amplifies and limits the cos $x$ shaft position signal for use as a gating signal, with the gating signal appearing on circuit 31 during time periods when the cos $x$ is positive and appearing on circuit 32 during periods of time in which the cos $x$ is negative. Thus gate 24 passes the control signal C to a comparator 33 when the cos $x$ shaft position signal is positive and gate 26 passes the control signal C to a comparator 34 when the cos $x$ is negative. Both comparators 33 and 34 also receive as inputs the sin $x$ shaft position signal after it has been rectified by a rectifier 36. Comparator 33 compares the control signal C to the rectified sin $x$ shaft position signal (during the appropriate time period as established by gate 24), and generates a phase A drive pulse on circuit 12 whenever the control signal C exceeds the rectified sin $x$ signal. In a similar fashion comparator 34 compares the control signal C to the rectified sin $x$ shaft position signal (during the appropriate time period as established by gate 26), and generates a phase $\overline{A}$ drive pulse on circuit 15 whenever the control signal C exceeds the rectified sin $x$ signal.

The control signal C in FIG. 3 also forms inputs to a pair of gates 27 and 28. The sin x shaft position signal on circuit 16 forms an input to an amplifier-limiter 37, which has plus and minus outputs on circuits 38 and 39 for driving the gating inputs of gates 27 and 28, respectively. The amplifier-limiter 37 amplifies and limits the sin x shaft position signal for use as a gating signal, with the gating signal appearing on circuit 38 during time periods when the sin x is positive and appearing on circuit 39 during periods of time in which the sin x is negative. Thus gate 27 passes the control signal C to a comparator 41 when the sin x shaft position signal is positive and gate 28 passes the control signal C to a comparator 42 when the sin x is negative. Both comparators 41 and 42 also receive as inputs the cos x shaft position signal after it has been rectified by a rectifier 43. Comparator 41 compares the control signal C to the rectified sin x shaft position signal (during the appropriate time period as established by gate 27), and generates a phase B drive pulse on circuit 13 whenever the control signal C exceeds the rectified cos x signal. In a similar fashion comparator 42 compares the control signal C to the rectified cos x shaft position signal (during the appropriate time period as established by gate 28), and generates a phase $\overline{B}$ drive pulse on circuit 20 whenever the control signal C exceeds the rectified cos x signal.

Thus the circuitry shown in FIG. 3 functions to provide drive pulses for the phases of the motor 11 by rectifying the shaft position signal for one phase, and then comparing the rectified signal to a control signal to develop the drive pulse for the other phase.

Figure 4:
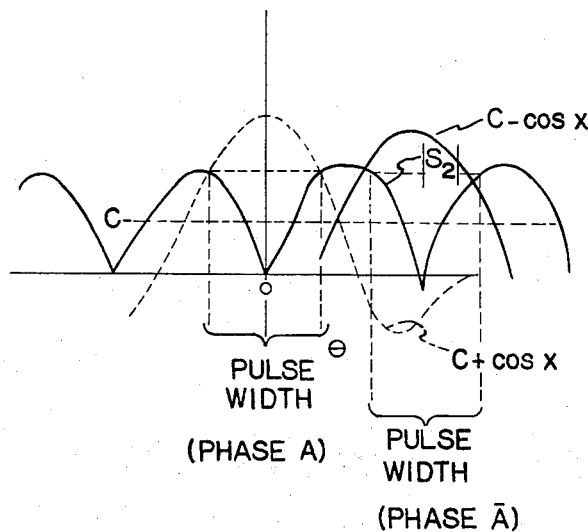
FIG. 4 is a wave diagram similar to FIG. 2 but illustrating another embodiment of the invention in which a periodic function is added to the feedback signal to form a composite signal which is then compared to the rectified shaft position signal for the other phase.

Turning now to consideration of FIG. 4, there are shown wave forms for deriving a drive pulse for driving one phase of a two-phase motor produced in accordance with another embodiment of the invention. In the embodiment shown in FIG. 4, again in order to derive the drive pulse for the S1 phase the shaft position signal for the S2 phase is rectified. Therefore, FIG. 4 illustrates a rectified sine wave labeled $S_2$. Instead of directly comparing the control signal C to the rectified signal $S_2$, a periodic function of x is added to C to form a combined or composite signal and, this combined or composite signal is compared to the rectified value of S2. In the specific illustration in FIG. 4 the cos of x is added to the feedback signal C so that the combined signal becomes $C + \cos x$, or $C - \cos x$ for deriving the other drive pulse for the S1 phase 180° later. This signal is compared to the rectified value of S2 and whenever it is greater than the rectified value of S2 a drive pulse for the S1 phase is produced. If the cos x signal is added to the control signal, then mathematically speaking $$C + \cos \theta = \sin \theta, \text{ where } 0 \leq \theta \leq \pi/2 \quad (13)$$

so that $dC/d\theta = \cos \theta + \sin \theta \quad (14)$ substituting them in the equation for feedback gain gives $$G = T_o \frac{1 - \frac{V_b}{V_s} \cos \theta}{1 + \tan \theta} \quad (15)$$

The gain curve for this situation where the cos x is added to C has essentially the same shape as that where C is utilized by itself for small values of switching angle. For larger values of switching angle up to $\theta$ equals 30° or so, the gain G is reasonably flat for typical values of $V_b$ divided by $V_s$, and the gain goes to zero as $\theta$ approaches 90°. Therefore, a feedback loop for this situation where the cos $\theta$ is added to C to form a composite or combined signal which is then compared to the rectified shaft position signal for the opposite phase, is more stable at large pulse widths.

In general, any periodic function $f(x)$ which is greater than zero at $x$ = zero can be used instead of the cos x wave discussed above. Then $C + f(\theta) = \sin \theta \quad (16)$ defines the switching angle and functions $f(x)$ can be derived which give even less variation in feedback gain pulse width.

FIG. 5 is a schematic diagram of a control system in accordance with this invention for producing motor drive pulses generally in accordance with the techniques illustrated by the wave forms in FIG. 4. In FIG. 5 a brushless motor 44 is, according to the embodiment illustrated, a two-phase motor having phases A and B. Thus drive pulse inputs A and B are provided to the motor 44 over circuits 46 and 47, and drive pulse inputs $\overline{A}$ and $\overline{B}$ (which are 180° out of phase with A and B, respectively) are provided over circuits 48 and 49. A shaft position encoder 51 is associated with the motor 44 and develops shaft position signals on circuits 52 and 53 which, according to this particular embodiment, are sin x and cos x, respectively.

The specific embodiment of the invention shown in FIG. 5 incorporates a feedback loop. Therefore, a tachometer 54 is provided to measure the speed of the motor 44 by generating an actual motor speed signal $\omega$ on a circuit 56. The actual motor speed signal $\omega$ on circuit 56 forms an input to a subtractor 57 which also has another input on a circuit 58 which is an $\omega$ control signal. The $\omega$ control signal corresponds to the desired speed for the motor 44. The output of the subtractor 57 is an $\omega$ error or C signal on a circuit 58. The C signal is the control signal for deriving the pulse width information as hereinafter described. In accordance with the specific embodiment shown in FIG. 5 this control signal C is generated as part of a feedback loop for controlling the speed of the motor 44. The invention is equally applicable, however, to control systems which do not have a feedback loop but in which a control signal is generated by any appropriate circuitry.

The control signal C forms inputs to an adder 59 and a subtractor 61. Both the adder 59 and subtractor 61 also receive as inputs the periodic signal cos x on circuit 53. The output of adder 59 on circuit 62 is $C + \cos x$, which forms an input to a comparator 63. The output of subtractor 61 on circuit 64 is $C - \cos x$, which forms an input to a comparator 66. The comparators 63 and 66 also receive as inputs the shaft position signal sin x after it has been rectified by a rectifier 67. Comparator 63 compares the composite signal $C + \cos x$ to the rectified shaft position signal sin x, and generates a phase A drive pulse on circuit 46 whenever the composite signal $C + \cos x$ exceeds the rectified sin x signal. Similarly, comparator 66 compares the composite signal $C - \cos x$ to the rectified shaft position signal sin x and generates an $\overline{A}$ drive pulse whenever the composite signal $C - \cos x$ exceeds the rectified sin x signal.

The control signal C also forms inputs to an adder 68 and a subtractor 69. Both the adder 68 and the subtractor 69 also receive as inputs the periodic signal sin x on circuit 52. The output of adder 68 on circuit 71 is $C + \sin x$, which forms an input to a comparator 72. The output of subtractor 69 on circuit 73 is $C - \sin x$, which forms an input to a comparator 74. The comparators 72 and 74 also receive as inputs the shaft position signal cos x after it has been rectified by a rectifier 76.

Comparator 72 compares the composite signal C + sin x to the rectified shaft position signal cos x, and generates a phase $\bar{B}$ drive pulse whenever the composite signal C + sin x exceeds the rectified cos x signal. Similarly, comparator 74 compares the composite signal C − sin x to the rectified shaft position signal cos x, and generates a phase B drive pulse whenever the composite signal C − sin x exceeds the rectified cos x signal.

Thus the embodiment of the invention shown in FIG. 5 functions to provide drive pulses for the phases of the motor 44 by rectifying the shaft position signal for one phase, and then comparing the rectified signal to a composite signal (consisting of a control signal combined with a periodic function) to develop the drive pulse for the other phase. In accordance with the specific embodiment shown in FIG. 5 the periodic function added to the control signal is a sinusoidal function (sin x and cos x). The sign of the sinusoidal function is selected to be either plus or minus so that the various drive pulses are generated during the appropriate time period of the 360° shaft rotation without requiring additional gating.

Figure 6:
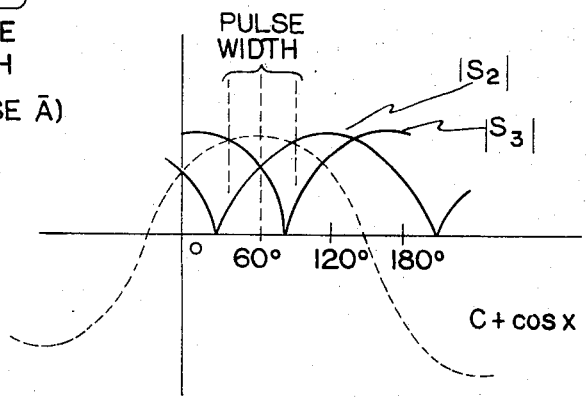
FIG. 6 is a wave diagram similar to FIG. 4 but illustrating the determination of pulse width for one phase of the three-phase motor.

What has been thus far discussed in connection with the various embodiments of the method and apparatus of this invention has been in connection with two-phase motors. The invention is also applicable to brushless motors having three or more phases, although of course the circuitry required for producing the various drive pulses becomes more complex. The wave form shown in FIG. 6 illustrate application of the invention to producing a drive pulse for one phase of a three-phase brushless motor. Assuming, for example, that the pulse being produced is the drive pulse for the S1 phase of a three-phase motor, then the shaft position signal for the S2 motor phase is rectified as shown in FIG. 6. The shaft position signal for the S3 motor phase is also rectified and superimposed on the rectifier S2 signal. As was the case in connection with the two-phase wave form shown in FIG. 4, the speed error signal is formed by adding a periodic function of x which in this case is cos x to C to produce the C + cos x wave form shown in FIG. 6. The C + cos x wave is then compared to the envelope of the rectified shaft position signal for the other two phases. This envelope is illustrated by the slightly thicker line in FIG. 6. Whenever the speed error signal C + cos x is greater than the envelope of the rectified shaft position signals for all the other phases of the motor, a drive pulse is produced for the one phase under consideration.

Similar considerations apply for deriving drive pulses for motors having more than three phases. In essence, in order to produce the drive pulse for one phase of a multi-phase motor, a control signal, which may or may not be part of a feedback loop, is compared against the envelope of the rectified shaft position signals for all the other phases of the motor. It should be further pointed out that although the shaft position signals in the specific embodiments discussed herein have been illustrated as sinusoidal, they need not be but may be any kind of periodic signal.

Thus what has been described is a method and apparatus for producing drive pulses for a brushless motor in which the drive pulses are fairly linearly related to a control signal and in which for systems having a feedback loop the feedback arrangements are stable. Although the invention has been described with reference to specific embodiments, it will be obvious to those skilled in the art that various modifications may be made to the specific embodiments disclosed herein without departing from the true spirit and scope of the invention.

I claim:

1. In a control circuit for a brushless motor of the type having a plurality of phases and where it is desired to accurately control the motor speed by comparison to a motor speed reference signal over a variety of load conditions, a shaft position encoder for developing a plurality of periodic shaft position signals, one for each of the plurality of motor phases, motor speed sensing means for developing a signal proportional to actual motor speed, means for comparing the actual motor speed signal to the motor speed reference signal to generate a speed error signal proportional to the variation therebetween, a plurality of pulse width derivation means, one for each of the motor phases, each of said pulse width derivation means comprising means for combining and rectifying the shaft position signals for all the motor phases other than the one phase for which the pulse is being derived to form a rectified signal, and comparator means for comparing said speed error signal to said rectified signal to form a drive pulse for the one phase.

2. A method of deriving drive pulses for a brushless motor of the type having a plurality of phases and where it is desired to accurately control the motor speed by comparison to a motor speed reference signal over a variety of load conditions comprising the steps of generating a plurality of periodic shaft position signals, one for each of the plurality of motor phases, generating a signal proportional to actual motor speed, comparing the actual motor speed signal to the motor speed reference signal to generate a speed error signal, rectifying and combining the shaft position signals for all the motor phases other than the one phase for which the pulse is being derived to form a rectified signal, and comparing the speed error signal to the rectified signal whereby a drive pulse is applied to the one phase whenever the speed error signal is greater than the rectified signal.

3. In a control circuit for a brushless motor of the type having a plurality of phases and where it is desired to accurately control the motor speed by comparison to a motor speed reference signal over a variety of load conditions, a shaft position encoder for developing a plurality of periodic shaft position signals, one for each of the plurality of motor phases, motor speed sensing means for developing a signal proportional to actual motor speed, function generating means for generating a periodic function having a frequency related to the frequency of the periodic shaft position signal, means for comparing the actual motor speed signal to the motor speed reference signal to generate a speed error signal representative of the variation therebetween, adder means for combining the speed error signal with said periodic function to form a composite feedback signal, a plurality of pulse width derivation means, one for each of the motor phases, each of said pulse width derivation means comprising means for rectifying and combining the shaft position signals for all the motor phases other than the one phase for which the pulse is being derived to form a rectified signal, and comparator means for comparing said composite feedback signal to said rectified signal to form a drive pulse for the one phase.

4. A control circuit in accordance with claim 3 in which said periodic function is a sinusoidal function.

5. A control circuit in accordance with claim 3 in which said shaft position encoder develops a plurality of periodic shaft position signals which are sinusoidal functions.

6. In a control circuit for a brushless motor of the type having a plurality of phases, a shaft position encoder for developing a plurality of periodic shaft position signals, one for each of the plurality of motor phases, means for generating a composite signal, a plurality of pulse width derivation means, one for each of the motor phases, each of said pulse width derivation means comprising means for combining and rectifying the shaft position signals for all the motor phases other than the one phase for which the pulse is being derived to form a rectified signal, and comparator means for comparing said composite signal to said rectified signal to form a drive pulse for the one phase.

7. A control circuit in accordance with claim 6 wherein said means for generating a composite signal generates a composite signal which is the sum of a control signal and a periodic signal, the periodic signal being related in frequency to the frequency of the shaft position signal.

8. A control circuit in accordance with claim 6 wherein the plurality of periodic shaft position signals are sinusoidal.

9. A control circuit in accordance with claim 7 wherein said periodic signal is a sinusoidal signal.

* * * * *

UNITED STATES PATENT AND TRADEMARK OFFICE
CERTIFICATE OF CORRECTION

PATENT NO. : 3,764,869
DATED : Oct. 9, 1973
INVENTOR(S) : JAMES R. WOODBURY

It is certified that error appears in the above—identified patent and that said Letters Patent are hereby corrected as shown below:

First page, correct name of Assignee to:
STANFORD RESEARCH INSTITUTE

Signed and Sealed this thirtieth Day of August 1977

[SEAL]

Attest:

RUTH C. MASON
*Attesting Officer*

C. MARSHALL DANN
*Commissioner of Patents and Trademarks*